United States Patent
James

(10) Patent No.: US 8,260,480 B2
(45) Date of Patent: Sep. 4, 2012

(54) AUTOMATIC CREATION, MAINTENANCE AND MONITORING OF A GUIDEWAY DATABASE

(75) Inventor: Demetri James, Flushing, NY (US)

(73) Assignee: Lockheed Martin Corporation, Bethesda, MD (US)

(*) Notice: Subject to any disclaimer, the term of this patent is extended or adjusted under 35 U.S.C. 154(b) by 477 days.

(21) Appl. No.: 12/357,109

(22) Filed: Jan. 21, 2009

(65) Prior Publication Data

US 2009/0187296 A1 Jul. 23, 2009

Related U.S. Application Data

(60) Provisional application No. 61/021,850, filed on Jan. 17, 2008.

(51) Int. Cl.
*G05D 1/00* (2006.01)

(52) U.S. Cl. ........................................................ 701/19
(58) Field of Classification Search .................. None
See application file for complete search history.

(56) References Cited

U.S. PATENT DOCUMENTS

| | | | |
|---|---|---|---|
| 2002/0059420 A1* | 5/2002 | Lin et al. | 709/224 |
| 2003/0132862 A1* | 7/2003 | Kurosawa | 340/995.1 |
| 2004/0104842 A1* | 6/2004 | Drury et al. | 342/357.13 |
| 2005/0107954 A1* | 5/2005 | Nahla | 701/301 |
| 2007/0040070 A1* | 2/2007 | Stevenson et al. | 246/122 R |
| 2008/0040029 A1* | 2/2008 | Breed | 701/208 |
| 2008/0183376 A1* | 7/2008 | Knockeart et al. | 701/119 |
| 2009/0030605 A1* | 1/2009 | Breed | 701/208 |
| 2009/0168974 A1* | 7/2009 | Mc Cormick | 379/45 |

* cited by examiner

*Primary Examiner* — Thomas Tarcza
*Assistant Examiner* — Nagi Murshed
(74) *Attorney, Agent, or Firm* — Kaplan Breyer Schwarz & Ottesen LLP

(57) ABSTRACT

A method and system for creating, maintain, and monitoring a guideway database is disclosed.

11 Claims, 3 Drawing Sheets

AUTOMATIC CREATION, MAINTENANCE AND MONITORING OF A GUIDEWAY DATABASE

STATEMENT OF RELATED CASES

This case claims priority of U.S. Provisional Patent Application Ser. No. 61/021,850, which was filed on Jan. 17, 2008 and is incorporated by reference herein.

FIELD OF THE INVENTION

The present invention relates in general to guideways, such as railways or roads, and, more particularly, to a guideway database

BACKGROUND OF THE INVENTION

In order for a train to move along its guideway (i.e., track), it must receive authorization. More particularly, a guideway traffic-control process requires that the train receive authorization to occupy and/or proceed along segments of the guideway, also referred to as blocks, which lie ahead or behind the segment that the train currently occupies.

A train running on a rail network must therefore be able to report its position, or have its block occupancy reported, to a control center. This enables the control center to determine the precise track segment that the train occupies. Among other vital functions, this is information is required so that the control center does not route another train onto the same track segment.

In order to perform vital (i.e., safety-critical) reporting of block occupancy on a railway, track circuits are typically used. And in order to increase the performance of a railway, modern systems comprises location determining systems that use satellite-aided (GPS) positioning techniques, sometimes in conjunction with inertial components (e.g., accelerometers and gyroscopes, etc.) to precisely report train position. In these applications, a "guideway" or "track" database forms a vital component of the guideway traffic-control process.

A guideway database store track information including the absolute and relative position of tracks and track transitions such as, for example, switches and turnouts. Ideally, railroad tracks are perfectly uniform and remain consistent with their original design as straight tangent sections connected by constant curve and spiral sections. In practice, however, weather and geographical conditions, train speeds, tonnage, and continued maintenance requirements contribute to railroad track non-uniformities. Furthermore, track surveys are rarely conducted with the accuracy required for positive train control.

Inaccuracies in a guideway database raise several serious safety concerns. One such concern is the not unusual incidence of a disparity between the output of a train's location determining system and the corresponding database information. Sometimes, reconciling these disparities sufficiently to resolve to a specific track (i.e., locate the train as being on a specific track at a specific position) with a high degree of confidence is problematic.

Also, the Federal Track Safety Standards (FTSS) divide railroad track into nine (9) speed-related classifications as a function of speed, with permissible variations of track geometry provided for each track class. Although the FRA (Federal Rail Administration) regulates the amount of track irregularities permitted for each track class, most track database information carries errors that can change with time and which are often difficult to and expensive to ascertain with accuracy.

The need for an accurate guideway database is clear. But techniques for creating and maintaining an accurate guideway database are quite costly. Typically, the guideway database is generated via separate systems under non-operational conditions. It would, therefore, be beneficial to develop less expensive and more expeditious ways for creating, maintaining and monitoring a guideway database.

SUMMARY OF THE INVENTION

The present invention provides a way to create, maintain, and monitor a guideway database without some of the costs and disadvantages of the prior art.

In accordance with the illustrative embodiment of the present invention, two forms of vehicle position are computed onboard. The first is the "operational vehicle position," which in some embodiments is based on an operational guideway database. The operational vehicle position may be computed from GPS, an inertial sensor, wheel tachometer and operational track-map data is used to locate the train on the approved operational track map. The operational vehicle-position data is used in the guideway traffic control process where the database is a safety-critical component of the process.

The second form of vehicle position is a "sensor-derived vehicle position," which is computed independently of the guideway database. The sensor-derived vehicle position would use only GPS, inertial sensor and wheel tachometer data to compute the position of the train. As a consequence, train position may not be located on a "known" track segment.

Both of these determinations of vehicle position are communicated back to the control center. A server in the control center records the reported vehicle positions and compares the block occupancy corresponding to the operational vehicle position to the block for which the vehicle has been given authority to operate. If the "operational vehicle position" was not derived onboard the train, the server would compute it from the "sensor-derived vehicle position" and the operational guideway database.

If the reported and authorized block occupancies match, then the sensor-derived vehicle position is input into a filter/modeling algorithm and used to update the operational guideway database. This increases the accuracy of the guideway database by accounting for changes that may have occurred due to operational use, maintenance activities, weather conditions, or terrestrial shifts.

Matching the reported and authorized block occupancies addresses location along the guideway; that is, it positively identifies the specific portion of the guideway that is being examined. But there remain two estimates of position (i.e., the operational vehicle position and the sensor-derived vehicle position). Which, if either, is correct, and how should the guideway database be updated using such data? Applying the filter/modeling algorithm to the sensor-derived vehicle position addresses this issue.

In some embodiments, a sensor-derived position accuracy and filter/modeling algorithm 'time constant' commensurate with the requirement for the operational track database is employed. An example of a modeling algorithm suitable for use is described in U.S. Published Patent Application 2006/0253233 A1, which is incorporated by reference herein.

The filtered and/or filtered/modeled data is also monitored to determine if threshold limits have been exceeded and operator action is required to prevent an unsafe operating condition.

After sufficient data has been accumulated and integrity checks satisfied, the operational database can be replaced by the updated one that has been validated through operational use.

Thus, if method disclosed herein is being used to maintain or monitor a guideway database, the basic operations include:

Sensor-derived and operational-vehicle derived position estimates are developed and compared to vehicle block authorizations. For the purpose of this specification and the appended claims, the term "block authorization," and its inflected forms, is defined as authorization to occupy and/or proceed along a particular segment of guideway (i.e., track).

If the position estimates and block authorization are consistent, the data is filtered and the guideway database is updated.

When sufficient data that meets threshold conditions is obtained, the guideway database is considered to be validated.

If the data is inconsistent, exception handling is invoked.

If the methods herein are being used to create a guideway database, the basic operations include:

Obtain block authority for the vehicle.

Update an existing database with authorized data.

When sufficient data that meets threshold conditions is obtained, the guideway database is considered to be validated.

DETAILED DESCRIPTION

Figure 1:
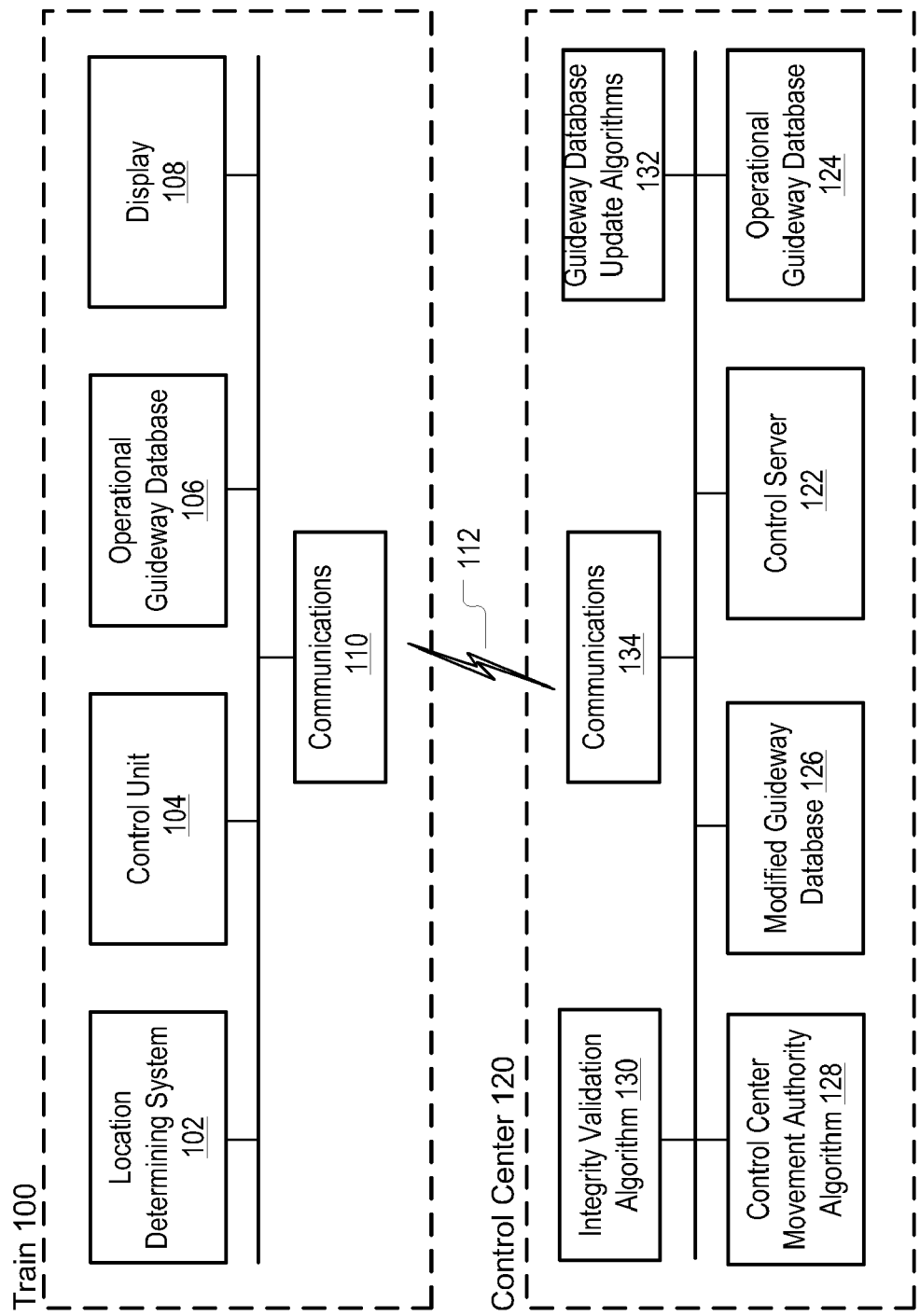
FIG. 1 depicts a block diagram of a system for creating and maintaining a guideway database in accordance with the illustrative embodiment of the present invention.

FIG. 1 depicts a system for use in creating and maintaining a guideway database in accordance with the illustrative embodiment of the present invention. The system includes subcomponents that are on-board train 100 as well as sub-components that are in control center 120. In some cases, the "sub-component" is a device or physical instrument. In some other cases, the "sub-component" is an algorithm, embodied as software that is stored in a computer accessible memory and is suitable for running on a general purpose processor. In yet some further cases, the sub-component is a database, which is stored in a computer-accessible memory.

The sub-components on-board train 100 that are used, in the illustrative embodiment, to implement the present method include location-determining system 102, a control unit 104, operational guideway database 106, display 108, and communications system 110.

Location determining system 102 is typically satellite-based (e.g., GPS) and, in some embodiments, will be augmented via inertial sensors, such as accelerometers, gyroscopes, and the like, to provide additional outputs such as speed and/or heading. Control unit 104 is a processor running software that is capable of carrying out at least some of the tasks depicted in FIG. 2 and described below. Operational Guideway Database 106 stores vital, pre-determined track information including the absolute and relative position and attitude (i.e., heading, grade, and super-elevation) of tracks and track transitions such as, for example, switches and turnouts. Display 108 is a CRT or other type of display device for indicating authorities, warnings, etc., for the crew of the train. Communications system 112 is a conventional wireless communications system by which the train communicates with a controlling entity (e.g., control center 120), among any other entities.

The sub-components at control center 120 for implementing the methods disclosed herein include control server 122, operational guideway database 124, modified guideway database 126, control center movement authority algorithm 128, integrity validation algorithm 130, guideway database update algorithm 132 and communications system 134.

Control server 122 includes a processor that runs the software that contains algorithms 128, 130, and 132, etc. to implement the methods described herein. Operational guideway database 124 is identical to operational guideway database 106 maintained on-board train 100. Modified guideway database 126 is created by updating the operational guideway database based on verified sensor-derived vehicle position. This is accomplished via guideway database update algorithms 132, which implement the tasks described in the method of FIG. 2.

Control Center movement authority algorithm 128 is used for determining the block occupancy corresponding to the operational vehicle position and for comparing that block occupancy to the block for which the vehicle has been given authority to operate. Integrity validation algorithm 130 runs integrity checks on the updated database for the purpose of validating the database, in known fashion. Communications system 134 is a conventional wireless communications system by which control center 120 communicates with train 100 among any other entities.

Figure 2:
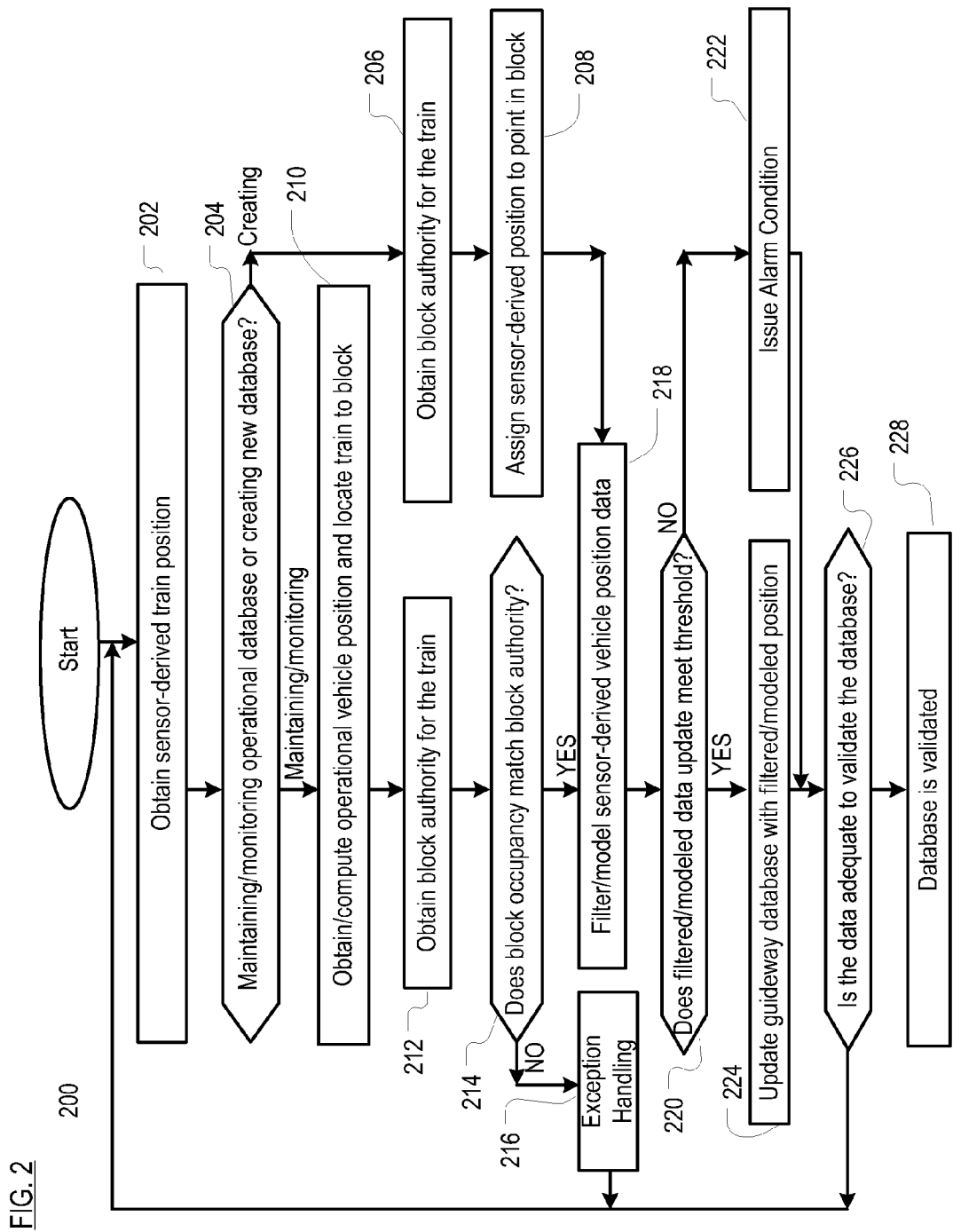
FIG. 2 depicts a flow chart of a method for creating and maintaining a guideway database in a control server.

FIG. 2 depicts method 200 for maintaining, monitoring, or creating a guideway database in accordance with the illustrative embodiment of the present invention.

Figure 3:
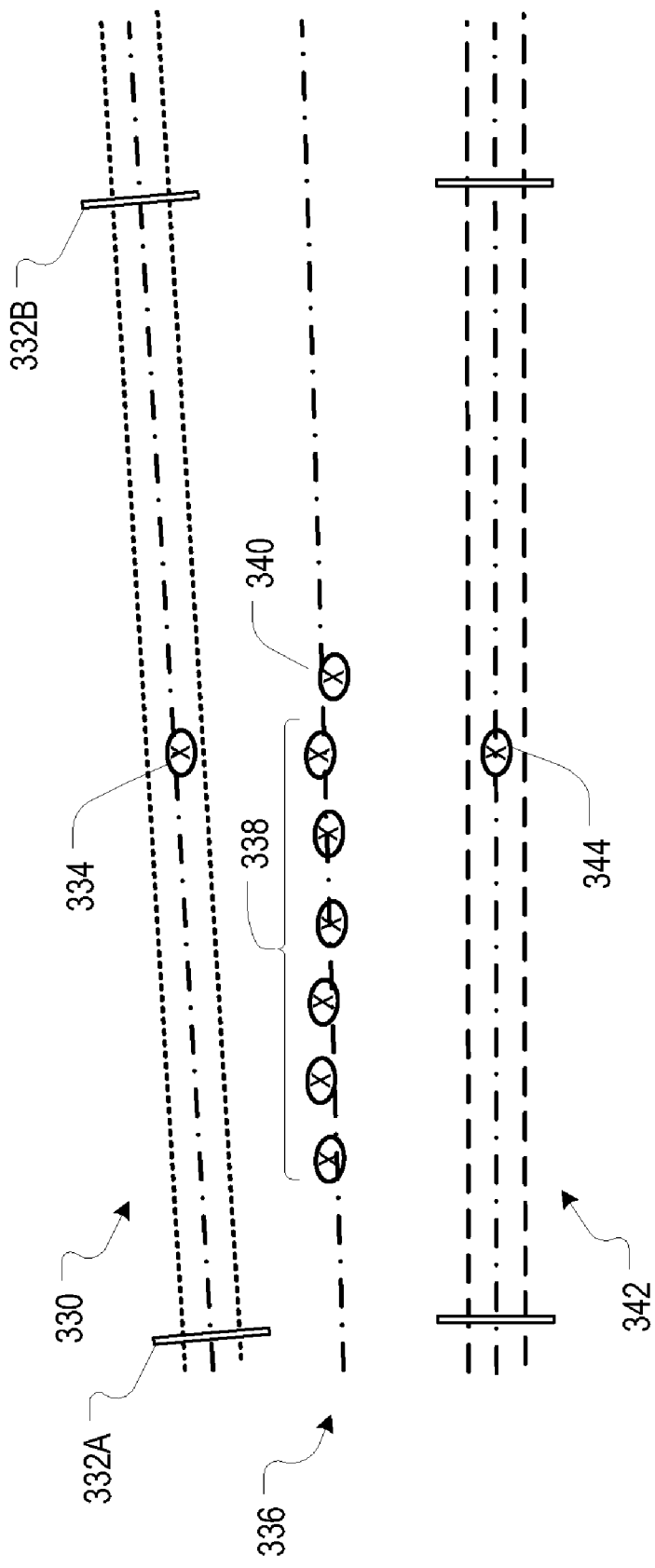
FIG. 3 depicts a comparison of true-vehicle position on a guideway, sensor-derived vehicle position from an updated database, and operational vehicle position from an operational database.

In operation 202 of method 200, sensor-derived train position is obtained (i.e., using location determining system 102). With reference to FIG. 3, the sensor-derived train position is depicted along line 336. A plurality of successive measurements of train location at shown at 338; a most recent reading is depicted at 340. Query, in operation 204, whether the task is to maintain/monitor a guideway database or to create a new database.

If a guideway database is being created, block authority for the train is obtained in operation 206 and the sensor-derived train position (from operation 202) is assigned to a point in the block, as per operation 208. This data is then filtered and/or filtered and modeled in accordance with operation 218 using, for example, techniques described in U.S. Published Patent Application 2006/0253233 A1 or other methods known to those skilled in the art.

If a guideway database is being maintained or monitored, processing continues at operation 210 wherein operational vehicle position is computed and located to a specific block. In this operation, operational vehicle position is computed using GPS and/or inertial sensors, or a wheel tachometer in conjunction with the operational track map to locate the train on the approved operational track map. With reference to FIG. 3, a guideway on the operational track map is shown at 330, wherein the beginning and end of a block are shown at 332A and 332B, respectively. A most recent calculated train position is shown at 334. Contrast operational vehicle position at 334 with the sensor-derived vehicle position at 340. Note that both of these position determinations may be incorrect; for example, the true position might be at 344. The discrepancies depicted in FIG. 3 are exaggerated to highlight the distinctions.

In operation 212, the block authority for the train is obtained. In accordance with operation 214, the computed block occupancy is compared to the authorized block authority. If there is no match between the computed and authorized occupancy, then "exception handling" operations are performed at operation 216. These operations include consideration of the reasons for the mismatch, such as GPS errors, etc., the number of mismatches observed, etc. For example, if there appears to be a problem with GPS, guideway database updating efforts might be suspended. If data collection is to continue, then processing loops back to operation 202.

If the computed and authorized block occupancy match, then the sensor-derived train position (from operation 202) is filtered and/or filtered and modeled in accordance with operation 218 using, for example, techniques described in U.S. Published Patent Application 2006/0253233 A1 or other methods known to those skilled in the art.

In operation 220, the filtered/modeled data, whether for maintaining/monitoring or creating a guideway database, is examined to determine if threshold limits (pertaining to errors/accuracy) have been exceeded.

Regarding the threshold limits, in embodiments in which the sensor-derived vehicle position is primarily influenced by GPS data, the "bias" (i.e., long-wavelength errors in the sensor-derived vehicle position) results principally from multi-path, clock, orbital, ionospheric and atmospheric error sources. The position errors in the operational track database are due principally to original errors when the database was created and changes in absolute track position, such as occur due to operational use, maintenance activities, weather conditions, and terrestrial shifts.

It is preferable that the sensor-derived position accuracy and filter/modeling algorithm 'time constant' be commensurate with the requirement for the operational track database. In some embodiments, the expected value of the sensor-derived position, or components of it, must be less than the required specification for the corresponding components in the track database.

As an illustration of the requirements for performance of the sensor-derived position, consider the cross-track component of guideway position. The expected absolute value of the sensor-derived cross-track position error could be specified as being less than a specified accuracy requirement $D_{CT}$ for the cross-track guideway database: $E(|\epsilon_{SDP-CT}|) \leq D_{CT}$. Alternatively, or additionally, the specification could include a requirement on the sensor-derived position accuracy that a test statistic must be less that a specified value, $S_{CT}$. For example, the requirement can be that the standard deviation of the cross-track error must be less than $S_{CT}$: $\phi(\epsilon_{SDP-CT}) \leq S_{CT}$. Alternatively, the requirement can be that 95% of the sensor-derived position errors must lie in a confidence interval of $S_{CT}$.

If the result of the query at operation 220 is that the data has exceeded the prescribed limits, then an alarm condition is issued in operation 222 and operator action is required to prevent an unsafe operating condition.

If, on the other hand, the data is within limits, then operational guideway database 106 is updated with the filtered/modeled data from operation 218 as per operation 224.

Query, at operation 226, whether the data is adequate to validate the database. Considerations include whether sufficient data has been collected and if integrity checks have been satisfied (e.g., based on integrity validation algorithm 130, etc.). If the answer to the query is "no," then processing loops back to operation 202 to develop more updating data. If the answer to the query is "yes," then the updated guideway database is considered to be validated, as per operation 228.

In the illustrative embodiment of method 200, operation 202 is conducted on-board train 100 and the other operations are conducted at control center 120. In some other embodiments, some or all of the operations 204 through 228 are conducted on-board train 100 (e.g., in control unit 104, etc.).

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method for updating an operational guideway database that is accessible by a computer, the method comprising:
   generating, by the computer, a first estimate of vehicle position based on the operational guideway database for a guideway, wherein the first estimate is generated on-board a vehicle that operates on the guideway according to a block authorization that gives the vehicle authority to operate;
   generating, by the computer, a second estimate of vehicle position, wherein the second estimate is independent of the operational guideway database, and wherein the second estimate is also generated on-board the vehicle that operates on the guideway;
   comparing, by the computer, (i) a block occupancy corresponding to at least one of the first estimate of vehicle position and the second estimate of vehicle position with (ii) the block authorization for the vehicle; and
   when the block occupancy and the block authorization match, updating, by the computer, the operational guideway database based on the second estimate of vehicle position.

2. The method of claim 1 wherein the first estimate of vehicle position is based on operational track-map data and at least one of: Global Positioning System ("GPS") data, inertial sensor data, and wheel tachometer data.

3. The method of claim 1 wherein the second estimate of vehicle position is based on at least one of: Global Positioning System ("GPS") data, inertial sensor data, and wheel tachometer data, but is not based on operational track-map data.

4. The method of claim 1 wherein the updating is further based on filtered data of the second estimate of vehicle position, wherein the filtered data is within predetermined limits.

5. A method for updating an operational guideway database that is accessible by at least one computer, the method comprising:
   generating, by a first computer, a first estimate of vehicle position based on the operational guideway database for a guideway, wherein the first estimate is generated on-board a vehicle that operates on the guideway according to a block authorization that gives the vehicle authority to operate;
   generating, by the first computer, a second estimate of vehicle position, wherein the second estimate is independent of the operational guideway database, and wherein the second estimate is also generated on-board the vehicle that operates on the guideway;
   comparing, by a second computer, (i) a block occupancy corresponding to at least one of the first estimate of vehicle position and the second estimate of vehicle position with (ii) the block authorization for the vehicle, wherein the second computer is in a control center that communicates with the vehicle; and when the block occupancy and the block authorization match, updating, by the second computer, the operational guideway database based on the second estimate of vehicle position.

6. The method of claim 5 wherein the first estimate of vehicle position is based on operational track-map data and at least one of: Global Positioning System ("GPS") data, inertial sensor data, and wheel tachometer data.

7. The method of claim 5 wherein the second estimate of vehicle position is based on at least one of: GPS data, inertial sensor data, and wheel tachometer data, but is not based on operational track-map data.

8. The method of claim 5 wherein the updating is further based on filtered data of the second estimate of vehicle position, wherein the filtered data is within predetermined limits.

9. A method for updating an operational guideway database that is accessible by a computer, the method comprising:

generating, by the computer, a first estimate of vehicle position based on the operational guideway database for a guideway, wherein the first estimate is generated on-board a vehicle that operates on the guideway according to a block authorization that gives the vehicle authority to operate;

generating, by the computer, a second estimate of vehicle position, wherein the second estimate is independent of the operational guideway database, and wherein the second estimate is also generated on-board the vehicle that operates on the guideway;

comparing, by the computer, (i) a block occupancy corresponding to the second estimate of vehicle position with (ii) the block authorization for the vehicle;

when the block occupancy and the block authorization match, filtering the second estimate; and when the filtered data is within predetermined limits, updating, by the computer, the operational guideway database based on the filtered second estimate of vehicle position.

10. The method of claim 9 wherein the first estimate of vehicle position is based on operational track-map data and at least one of: Global Positioning System ("GPS") data, inertial sensor data, and wheel tachometer data.

11. The method of claim 9 wherein the second estimate of vehicle position is based on at least one of: Global Positioning System ("GPS") data, inertial sensor data, and wheel tachometer data, but is not based on operational track-map data.

* * * * *